United States Patent [19]
Kleeberg et al.

[11] Patent Number: 5,089,290
[45] Date of Patent: Feb. 18, 1992

[54] METHOD FOR GENERATING GLOW-POLYMERISATE LAYERS

[75] Inventors: Wolf Kleeberg, Erlangen; Johann Kammermaier, Unterhaching; Rolf-Winfried Schulte, Erlangen, all of Fed. Rep. of Germany

[73] Assignee: Siemens Aktiengesellschaft, Berlin & Munich, Fed. Rep. of Germany

[21] Appl. No.: 622,206

[22] Filed: Nov. 30, 1990

Related U.S. Application Data

[63] Continuation of Ser. No. 485,865, Feb. 23, 1990, abandoned, which is a continuation of Ser. No. 312,365, Feb. 14, 1989, abandoned, which is a continuation of Ser. No. 630,713, Jul. 13, 1984, abandoned.

[30] Foreign Application Priority Data

Jul. 22, 1983 [DE] Fed. Rep. of Germany ....... 3326376

[51] Int. Cl.$^5$ .............................................. B05D 3/06
[52] U.S. Cl. .................................. 427/41; 427/255.3; 427/255.6; 427/377; 427/385.5
[58] Field of Search .................... 427/41, 377, 385.5, 427/255.3, 255.6

[56] References Cited

U.S. PATENT DOCUMENTS 4,096,315 6/1978 Kubacki .............................. 427/41 X
4,252,848 2/1981 Datta et al. ........................ 427/41 X Primary Examiner—Bernard Pianalto
Attorney, Agent, or Firm—Kenyon & Kenyon

[57] ABSTRACT

Starting from hydrocarbons and/or fluorocarbons, glow polymerisate layers can be generated on a substrate by means of a high-frequency low-pressure glow discharge. Chemically stable layers are obtained if the glow polymerisate is subjected, after the preparation and with the exclusion of air, to an annealing process in an atmosphere of hydrocarbon and/or fluorocarbon monomers at temperatures between 100° and 450° C. for 1 to 10 hours, or if the substrate is heated to temperatures between 100° and 450° C. during the preparation of the glow polymerisate.

15 Claims, 1 Drawing Sheet

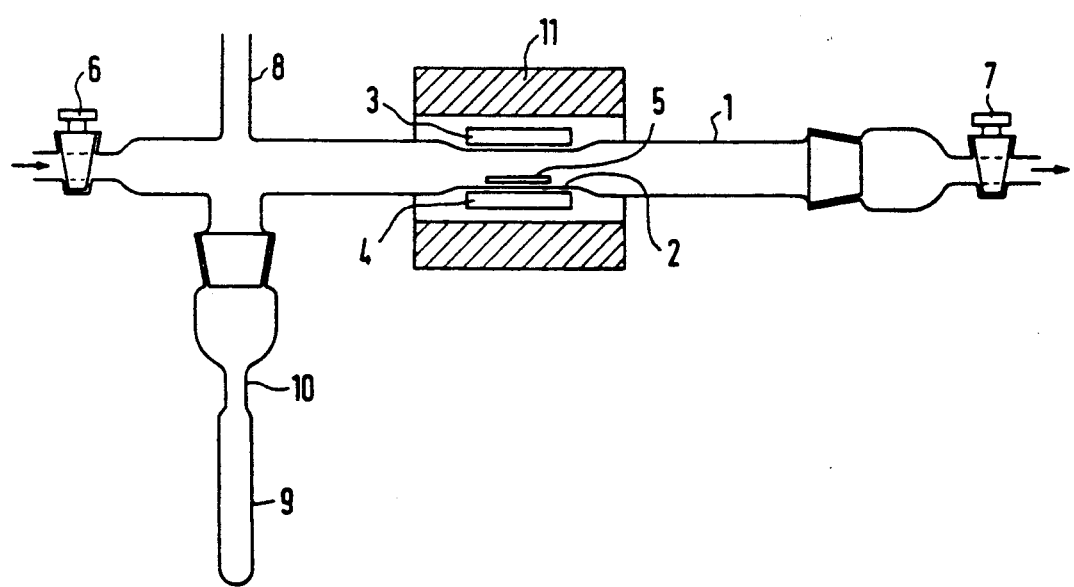

METHOD FOR GENERATING GLOW-POLYMERISATE LAYERS

This application is a continuation of application Ser. No. 07/485,865, filed Feb. 23, 1990, which is a continuation of Ser. No. 07/312,365, filed Feb. 14, 1989, now abandoned; which is a continuation of Ser. No. 06/630,713, filed July 13, 1984, now abandoned.

BACKGROUND OF THE INVENTION

This invention relates to a method for generating glow-polymerisates of monomeric hydrocarbons and/or fluorocarbons in layers on a substrate by means of a high-frequency, low-pressure glow discharge.

Glow polymerization in which, starting from gaseous organic monomers, polymers are generated on a substrate by low-pressure plasma excitation, permits the preparation of thin uniform layers without pores. This technique is also useful in the formation of polymers from monomers which cannot otherwise be polymerized. A particularly advantageous technique for generating low-pressure plasmas for glow polymerization is high-frequency discharge, especially discharge in the radio-frequency range (see A. T. Bell in S. Veprek, M. Venugopalan, "Plasma Chemistry III", Springer-Verlag, Berlin Heidelberg, 1980, pages 43 ff) i.e., in the range between 0.1 and 100 MHz (RF), and in the microwave range (see: "J. Macromol. Sci.-Chem." A 14(3), pages 321 to 337, 1980), i.e., in the range between 0.1 and 1,000 GHz (MW). By this technique, energy can be coupled into the plasma (i.e., into the reactor in which the glow polymerization is carried out) without difficulty via external lines, capacitively or inductively and also via hollow conductors such as resonator cavities, so-called "slow wave structures" etc., whereby a reactive interaction between the electrically conducting parts and the plasma is prevented.

An interesting use of glow polymerization is in the preparation of layers from hydrocarbons (CH) and fluorocarbons (CF). In such a case, glow polymerisates with properties which can be specified over a wide range, can be produced from the organic monomers employed and which comprise a broad spectrum of polymerizable compounds. In this manner, polymer films can be prepared from CH and/or CF which possess highly desirable properties such as low-loss dielectrics, coatings which have low surface energies and are therefore liquidrepellent, sensitive resist layers for dry-structuring processes in X-ray and electron beam lithography, thin-film diaphragms for electromedical applications and electrets for various applications. These films can be produced with qualitatively and quantitatively high yields.

However, it is very difficult to avoid the formation of unsaturated structures and radicals during RF glow discharge which are incorporated into the CH or CF layers and then are reacted oxidatively in the presence of air or oxygen, or possibly also react with other reactable compounds. This in turn gives rise to chemically changed behavior of the generated layers due to undesired or undefined polarity. For instance, lyophility in the action of solvents, or substantial changes of the properties in the presence of moisture may result. This fact is due to the circumstance that some of the H or F atoms are split off from the monomer molecules in RF plasmas through collisions with electrons and are carried away by the gas stream of the monomeric component, and are thereby unavailable for polymerization and layer generation. Due to the resulting H/C or F/C ratios, which are smaller than 2 and which are understoichiometric in comparison to the monomers (see in this connection; E. Kay, J. Coburn and A. Dilks in S. Veprek, M. Venugopalan, "Plasma Chemistry III", Springer-Verlag, Berlin Heidelberg, 1980, page 1 ff) there remain in the layers primary free valences of the C-atoms which result in the formation of unsaturated structures and frozen-in radicals which cause chemical instability.

OBJECT AND SUMMARY OF THE INVENTION

It is an object of the invention to further develop a method of the above mentioned type for generating glow polymerisate layers in such a manner that chemically stable products are obtained. According to the invention, this is achieved by the provision that the glow polymerisate is subjected, after preparation and with the exclusion of air, to an annealing process in an atmosphere of hydrocarbon and/or fluorocarbon monomers at temperatures between 100° and 450° C. for a period of 1 to 10 hours.

Description of The Drawings

The drawing shows an apparatus suitable for use in practicing the invention.

Suitable Description of The Invention

In the method according to the invention, layers are generated, which are chemically and physically stable, by achieving a complete or partial equalization of the H or F deficiency of the primary glow polymerisates. The annealing process may be also applied for a short time at a temperature above 450° C.

Alternatively to the above mentioned procedure (the so-called reactive post-anneal), the substrate on which the glow polymerisate is to be deposited may be heated during the preparation of the glow polymerisate to temperatures between 100° and 450° C. This second procedure also removes low-molecular volatile polymerisate components from the layer. The layer is also stabilized by saturation of the frozen-in radicals. One works with the exclusion of air also in this alternative procedure, due to the conditions necessarily prevailing during glow polymerisation.

In the method according to the invention, the basic disadvantage inherent in high frequency glow polymerisation, namely, the chemical instability of the glow polymerisates initially generated, is utilized for the preparation of chemically and physically stable layers. The deficiency, which is inherent in the initially generated glow polymerisates, can also be used for the preparation of layers which exhibit, besides a stable nature, certain properties which can be produced in a targeted manner. Thus, according to one advantageous embodiment of the method according to the invention, the hydrocarbon or fluorocarbon monomers are replaced in the reactive post-anneal, at least partially, by another reactive gaseous component. Optionally, an inert gas such as argon can be added to this reactive component.

As the reactive gaseous component, for instance, hydrogen or fluorine can be used in the method according to the invention, i.e., inorganic components. In addition however, also CH— and CF— containing gases are useful. Here, the reactive components which cause saturation of the frozenin radicals, lead to nonpolar glow polymerisate layers with lyophobic character.

Such glow polymerisate layers are suitable, for instance, for dielectrics or as liquid-repellent coatings. To the named reactive components can also be added specific radical collectors such as 1,1-diphenylethylene. Also inorganic compounds such as oxygen ($O_2$), sulfur dioxide ($SO_2$), water vapour ($H_2O$) and mixtures of these compounds, or ammonia ($NH_3$), as well as primary and secondary amines ($RNH_2$ or $R_2NH$) can be employed. Such reactive components lead to stabilized polar glow polymerisate layers with a targeted lyophilic or hydrophilic character which are suited, for instance, for use as thin-film diaphragms.

In the method according to the invention, in which the glow polymerisates are subjected, under exclusion of air or oxygen, to a subsequent reactive annealing process in an atmosphere of hydrocarbon and/or fluorocarbon compounds, or the preparation of the glow polymerisates takes place at an elevated temperature, the unsaturated valences being formed are saturated with hydrogen or fluorine atoms or C—H or C—F groupings, whereby layers are produced which have a high H/C or F/C ratio. In addition, it is assured with this method that due to the moderate temperatures which are used, no thermal damage of the layers occurs. A blending of the layers similar to that achieved by a sintering processes can also be achieved which has a favorable effect on their homogeneous character.

With the method according to the invention one works preferably at a temperature of about 400° C. At this temperature, the required splitting of C—H or C—F and of C—C bonds in the gaseous monomer molecules is assured to a sufficient degree, so that also the reaction rate of the reactive anneal is sufficiently high.

If the reactive anneal occurs at a time after the generation of the glow polymerisate layers, the heat treatment is carried out over a period of between 1 and 10 hours; an advantageous procedure here is that one heats slowly to the maximum temperature used during the anneal, then holds this temperature for a relatively short time and then cools down in a relatively short time. With glow-polymerized layers on a CH— CF— basis, the annealing can also be carried out in an electric field to obtain electret properties.

If the glow polymerization and the reactive anneal proceed simultaneously, the duration of the heat treatment depends on the time necessary to precipitate the glow polymerisate onto the substrate. The precipitation time in turn depends on the desired layer thickness and the precipitation conditions. In general, it is between 30 minutes and 3 hours. However, this time is sufficient for the above mentioned procedure (i.e., simultaneous occurrence of the glow polymerization and the anneal) for obtaining layers with the desired properties.

The following compounds are examples of the monomers which may be used in the method according to this the invention. Suitable hydrocarbon monomers include ethylene, propene, butene, butadiene and cyclohexane. Preferably, organic perfluorized compounds, i.e., fluorocarbons, are used in this procedure, and specifically for the glow polymerization as well as for the reactive anneal. Octofluorocyclobutane $C_4F_8$ (perfluorocyclobutane) serves well here as a monomer fluorine compound. In addition, however, also other perfluorized hydrocarbons can be considered such as tetrafluoroethylene $C_2F_4$, perfluoropropene $C_3F_6$, perfluorobutene $C_4F_8$ and perfluorocyclohexane $C_6F_{12}$.

With the method according to the invention, the flow velocity of the reaction gas, for instance, of the fluorine-containing organic compound, is generally 10 to 1,000 mbar $cm^3$ $sec^{-1}$ and the working pressure is $10^{-2}$ to 10 mbar. This applies not only to the "normal" generation of the glow polymerisate layer, but also in the case that the glow polymerization and the reactive anneal occur simultaneously. If the reactive anneal occurs at a time after the preparation of the glow polymerisate layer, then the reaction gas pressure is typically $10^{-2}$ to 1,000 mbar. The excitation frequency of the low-pressure glow discharge is in the RF range, generally 0.1 to 100 MHz and preferably 0.1 to 30 MHz and, in the microwave range it is generally 0.1 to 1,000 GHz and preferably 0.1 to 100 GHz.

The drawing shows an apparatus suitable for the practice of the method of the present invention. The invention will be described in greater detail with the aid of examples and with reference to the drawing in which an advantageous embodiment of a device for carrying out the method according to the invention is shown.

The device shown in the drawing is useful for the preparation of glow polymerisates and for their reactive anneal. To this end, the device comprises a discharge tube 1 of glass which is flattened to form a discharge chamber 2, with a rectangular cross section approximately in the middle on part of its length. In the region of the discharge chamber 2, two electrodes 3 and 4 are arranged on the outside of tube 1, which are connected to a high-frequency generator, which is not shown in the figure. In the discharge chamber 2 is disposed on the bottom of the discharge tube 1, the substrate 5 to be coated, for instance, a nozzle support of a recorder working with droplets of a liquid. The method according to the invention can be used for the direct generation of a chemically stable layer on the nozzle support of such recording equipment which is known, for instance, from U.S. Pat. No. 4,072,959 (see also U.S. Pat. No. 4,409,601). In order to prevent in this recorder a wetting of the side of the nozzle support facing the record carrier, with recording liquid, it has already been proposed to provide this side of the nozzle support with a liquid-repellent layer of polyethylene or polytetrafluoroethylene (U.S. Pat. application Ser. No. 483,874, "Recording Apparatus Using Fluid Droplets", filed Apr. 11, 1983). A corresponding method was proposed in U.S. patent application Ser. No. 486,004, "Method for Producing A Lyophobic Layer", filed Apr. 18, 1983.

The discharge tube 1 is supplied via a cock 6 with the reaction gas, and the latter is discharged via a cock 7; a stub 8 at the discharge tube 1 serves for connecting a pressure gauge, not shown in the figure. At the discharge tube 1 is further provided a glass ampule 9 which can receive the substrate 5 after the coating. For sealing, the ampule 9 can be fused-off at the constriction 10. In the region of the discharge chamber 2, the tube 1, finally, is provided with a heating system, i.e., a tubular oven 11.

EXAMPLE 1

After the nozzle carrier 5 nozzle support to be coated is installed, the discharge tube 1 (together with the ampule 9) is evacuated via the cock 7 by a vacuum pump to about $10^{-3}$ mbar. Subsequently, the reaction gas, for instance, gaseous octafluorocyclobutane is fed in through the cock 6. The flow velocity is adjusted by means of a conventional dosing valve, which is not shown in the figure, to approximately 170 mbar.$cm^3$.$sec^{-1}$. With the aid of a likewise not shown throttling valve in the gas discharge, the suction capacity of the vacuum pump is then reduced to the point that a working pressure of about 0.5 mbar is obtained. Then, the glow discharge is fired by applying to the electrodes 3 and 4 a high frequency voltage supplied by the high frequency generator. The frequency is, for instance, approximately 13.5 MHz. In the course of 45 minutes, a layer about 3 μm thick is formed on the nozzle carrier.

After the glow discharge is switched off, the discharge tube 1 is evacuated again and subsequently filled, together with the ampule 9, with the reaction gas used for the reactive anneal, for instance, with octafluorocyclobutane at a pressure of 700 mbar. The filling pressure can be varied over a relatively wide range, however. With the cocks 6 and 7, closed, the discharge tube 1 is then separated from the rest of the system and is inclined so that the coated nozzle carrier 5 slides into the ampule 9; the latter is then sealed by fusion at the constriction 10. Subsequently, the ampule 9 is placed in a chamber oven and is heated to about 400° C. in the course of 6 hours. After another hour (temperature: 400° C.), the oven is switched off and the ampule is cooled off within one hour from 400° C. to room temperature. The ampule is opened in a manner known per se. The glow polymerisate layer on the nozzle carrier has a layer thickness of about 1 μm after the anneal. With the procedure described it is ensured that the layer does not come into contact with the air oxygen between the precipitation and the initiation of the reactive anneal and thus, a reaction with captured radicals, forming lyophilic C=O-groups does not take place.

EXAMPLE 2

A nozzle carrier 5 is coated in accordance with Example 1. However, the coated nozzle carrier is not transferred into the ampule 9 but it remains in the discharge chamber 2, because in this case the heating system 11 is used to effect the anneal. Retaining the flow velocity of about 170 mbar.cm$^3$.sec$^{-1}$, the octafluorocyclobutane pressure in the tube 1 is increased for this purpose by greater throttling of the suction capacity of the vacuum pump (by means of a throttling valve), to about 50 mbar. Then, heat is applied to about 400° C. within six hours and after another hour (within one hour) is cooled down to room temperature. This procedure has the advantage that low-molecular intermediate products which are built into the layer during the coating and are liberated again during the anneal, can be removed with the reaction gas stream.

EXAMPLE 3

After inserting the nozzle carrier 5 to be coated and after the discharge tube 1 is evacuated, an octafluorocyclobutane flow of about 170 mbar cm$^{-1}$ and a working pressure of about 0.5 mbar are adjusted, as described in Example 1. By means of the heating system 11, the discharge tube 1 and the nozzle carrier 5 are heated up to about 400° C. After the firing of the glow discharge the coating of the nozzle carrier takes place at about 400° C. After the desired layer thickness is reached, the discharge is turned off and the temperature is lowered in the course of an hour from 400° C. to room temperature. This procedure has the advantage that the two processes, namely, the coating, i.e., the generation of the glow polymerisate layer and the reactive annealing, take place in one step.

The glow polymerisate layers prepared in the manner described above have a composition similar to PTFE, as shown by IR-spectroscopic examinations. ESCA measurements, i.e., the determination of the bonding states by means of an electronspectroscope show an F/C ratio of nearly 2:1. These layers are found to be lyophobic to a high degree, and they are, for instance, stable also during extended exposure of the ink liquid of recorders of the type mentioned above.

What is claimed is:

1. A method for the generation of polymer layers on a substrate comprising:
    glow discharging monomers selected from the group consisting of hydrocarbons, fluorocarbons and mixtures of hydrocarbons and fluorocarbons at a high frequency and low pressure to form polymer layers on the substrate, and
    annealing the polymer layers in an atmosphere comprising at least one hydrocarbon and/or fluorocarbon monomer and in the absence of air at a temperature of between 100° and 450° C. for between 1 and 10 hours.

2. The method of claim 1 wherein said annealing atmosphere also further comprises a reactive gas selected from the group consisting of hydrogen and fluorine.

3. The method of claim 1 wherein said annealing atmosphere further comprises a reactive gas selected from the group consisting of oxygen, sulfur dioxide, steam and mixtures thereof, ammonia, primary amines and secondary amines.

4. The method of claims 1 or 3 wherein said annealing is carried out in an electric field.

5. The method of claims 1 or 3 wherein said annealing is carried out at a temperature of about 400° C.

6. The method of claim 5 wherein said glow discharged monomer is a perfluorocarbon.

7. The method of claim 6 wherein said perfluorocarbon is octafluorocyclobutane.

8. The method of claims 1 or 3 wherein said glow discharged monomer is a perfluorocarbon.

9. The method of claim 6 wherein said perfluorocarbon is octafluorocyclobutane.

10. A method for the generation of polymer layers on a substrate comprising glow discharging monomers on a substrate in the absence of air and heating said substrate to a temperature of between 100° C. and 450° C. during the glow discharging of the monomers, wherein said glow discharged monomers are selected from the group consisting of hydrocarbons, fluorocarbons and mixtures of hydrocarbons and fluorocarbons.

11. The method of claim 10 wherein said monomer is a perfluorocarbon.

12. The method of claim 11 wherein said perfluorocarbon is octafluorocyclobutane.

13. The method of claim 12 wherein said temperature is about 400° C.

14. The method of claim 11 wherein said temperature is about 400° C.

15. The method of claim 10 wherein said temperature is about 400° C.

* * * * *